G. O. LEOPOLD.
CHAIN DRILL.
APPLICATION FILED DEC. 15, 1911.
1,060,467.
Patented Apr. 29, 1913.
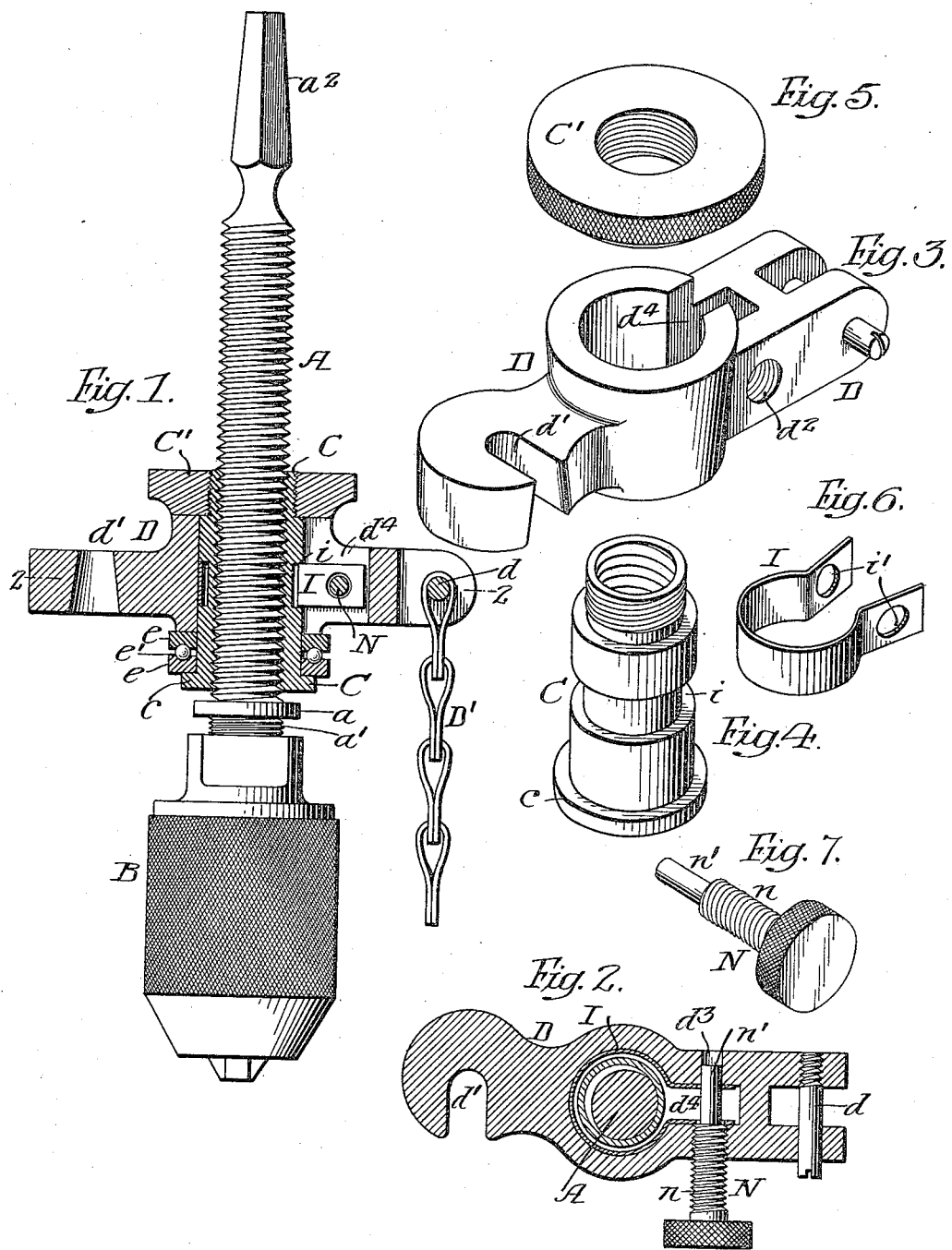
Inventor.—
George O. Leopold.
by his Attorneys.

UNITED STATES PATENT OFFICE.

GEORGE O. LEOPOLD, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

CHAIN DRILL.

1,060,467.  Specification of Letters Patent.  Patented Apr. 29, 1913.

Application filed December 15, 1911. Serial No. 666,029.

*To all whom it may concern:*

Be it known that I, GEORGE O. LEOPOLD, a citizen of the United States, residing in Philadelphia, Pennsylvania, have invented certain Improvements in Chain Drills, of which the following is a specification.

The object of my invention is to improve the construction of chain drills so that the friction feed can be regulated as desired. This object I attain in the following manner, reference being had to the accompanying drawing, in which:—

Figure 1, is a vertical sectional view illustrating my improved chain drill; Fig. 2, is a sectional plan view on the line 2—2, Fig. 1; Fig. 3, is a perspective view of the head to which the chain is attached; Fig. 4, is a perspective view of the sleeve on which the head is mounted; Fig. 5, is a perspective view of a nut which confines the head to the sleeve; Fig. 6, is a detached perspective view of the friction band; and Fig. 7, is a perspective view of the adjusting screw.

A is a threaded spindle having a shoulder $a$ on which is mounted the chuck or other tool holder B. The opposite end of the stem, in the present instance, has a squared, tapered end $a^2$ to which can be applied any means for driving the spindle.

C is the sleeve having an internal screw thread tapered to the thread of the spindle A, and this sleeve has a shoulder $c$ at its lower end, and mounted on the shoulder is a ball bearing consisting of two race-ways $e, e$ between which is mounted a series of balls $e'$. On this ball bearing is located the head D. This head is confined to the sleeve by a nut C' adapted to the threaded extension of the said sleeve. On one arm of the head D is a pin $d$ to which is attached a chain D'. The other arm is notched, as at $d'$, to receive the loose end of the chain. The notch is preferably tapered, as indicated in Fig. 3. The sleeve C has an annular groove $i$ in which is a spring friction band I, clearly shown in Fig. 6. This band has an extension in which are holes $i'$. The projecting ends of the band extend into a recess $d^4$ in the head D and have holes $i'$ which register with openings $d^2, d^3$ in the head.

N is an adjusting screw having a threaded portion $n$ adapted to the threaded opening $d^2$, and a reduced portion $n'$ which passes through the holes $i'$ in the band I and into the opening $d^3$ in line with the threaded opening $d^2$. By turning the screw N pressure can be exerted upon the band I so that it will bind upon the sleeve C and by this means the feed of the spindle through the head D can be regulated, as desired.

It will be understood that when the band is free from contact with the base of the annular groove $i$ in the sleeve C, the sleeve C can freely rotate in the head, but when the screw N is turned so that the band will bear upon the sleeve then the sleeve has a tendency to remain stationary with the head, and this tendency will increase as pressure is applied.

I claim:—

The combination in a chain drill, of a head; a chain attached to the head and by which the head is secured to the device to be drilled; an internally threaded sleeve mounted so as to rotate freely in the head; a screw threaded tool spindle extending through the sleeve; means at one end of the screw threaded tool spindle for holding the tool; the head having a recess communicating with the opening through which the sleeve extends; said sleeve having an annular groove; a spring band having perforated ends and adapted to the groove in the sleeve; and an adjusting screw adapted to the threaded opening in the head and extending through the perforated ends of the spring band; the said screw having a shoulder bearing against one of said ends so that, on turning the screw, more or less friction can be applied to the band.

In testimony whereof, I have signed my name to this specification, in the presence of two subscribing witnesses.

GEORGE O. LEOPOLD.

Witnesses:
 WM. E. SHUPE,
 WM. A. BARR.

Copies of this patent may be obtained for five cents each, by addressing the "Commissioner of Patents, Washington, D. C."